Figure 1:
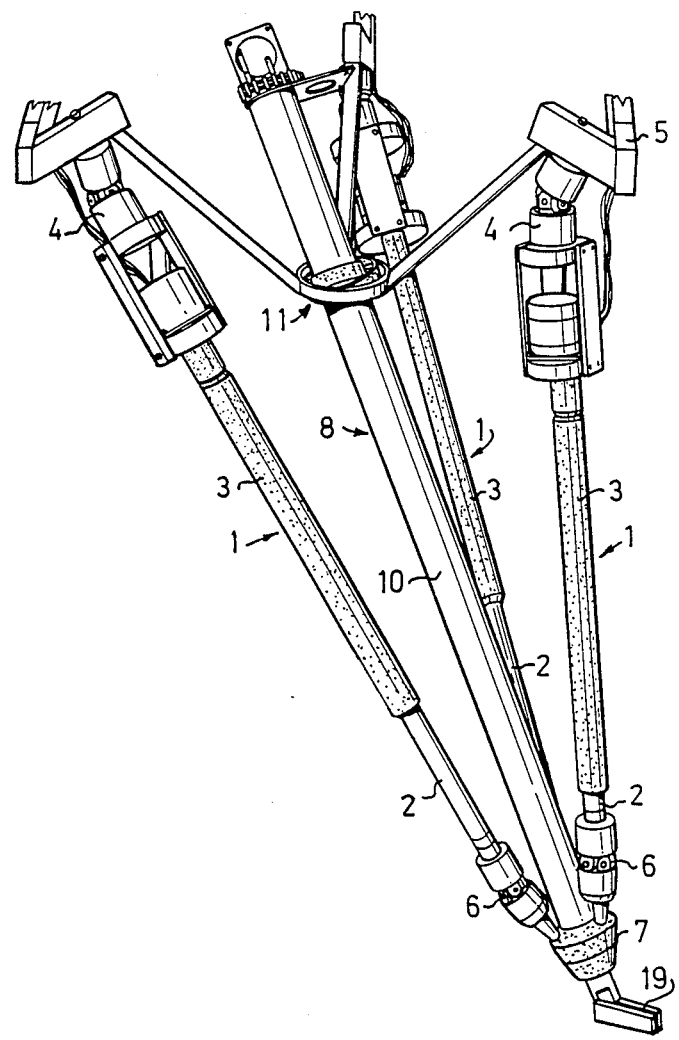

United States Patent [19]

Neumann

[11] Patent Number: 4,732,525

[45] Date of Patent: Mar. 22, 1988

[54] ROBOT

[75] Inventor: Karl-Erik Neumann, Gräddö, Sweden

[73] Assignee: Neos Product HB, Norrtalje, Sweden

[21] Appl. No.: 854,355

[22] Filed: Apr. 21, 1986

[30] Foreign Application Priority Data

May 10, 1985 [SE] Sweden ................................ 8502327

[51] Int. Cl.⁴ ............................................... B25J 9/14
[52] U.S. Cl. ..................................... 414/729; 901/22; 901/28
[58] Field of Search ...................... 414/680, 735, 729; 901/28, 29, 22, 25; 248/653, 654; 182/2

[56] References Cited

U.S. PATENT DOCUMENTS 4,569,627 2/1986 Simunovic .......................... 414/735

FOREIGN PATENT DOCUMENTS 148216 5/1983 Norway .
1083017 3/1984 U.S.S.R. ................................ 901/28

Primary Examiner—Leslie J. Paperner
Assistant Examiner—Donald W. Underwood
Attorney, Agent, or Firm—Armstrong, Nikaido, Marmelstein & Kubovcik

[57] ABSTRACT

The present invention relates to a robot comprising a positioning head (7) which is moved to the desired position with the aid of setting devices (1) which can be lengthened or shortened. Each setting device (1) is secured via a first joint (4) in a fixed frame (5), enabling each setting device (1) to pivot freely in relation to the frame. Each setting device (1) is attached via a second joint (6) to the movable positioning head (7). An arm (8) extending from the positioning head (7) is located between the setting devices and extends through the central opening of a universal joint (11) supported by the frame (5). The arm is movable in axial direction in relation to the joint and is controlled thereby in radial direction. It can also be set at different angles to the frame (5).

9 Claims, 4 Drawing Figures

ROBOT

The present invention relates to a robot comprising at least three setting devices which can be lengthened or shortened in longitudinal direction, each setting device being secured via a first joint in a fixed frame enabling each setting device to pivot freely in relation to the frame and one end of each setting device being attached via a second joint in a movable positioning head, and an intermediate arm extending from the positioning head and located between the setting devices.

Such a robot is already known through Norwegian Pat. No. No-B-148 216, for example. The intermediate arm, intended to carry load, is here displaceable in a cylinder which is in turn jointed to a frame. However, this arrangement can only move relatively low loads since the intermediate arm is inclined with respect to the cylinder when a load is applied. When the positioning head is moved with the aid of setting devices so that the arm is displaced in the cylinder the arm will, due to this inclination, become nipped in the cylinder if heavy loads are applied. This will either prevent further movement of the positioning head or give rise to considerable, damaging vibrations. This known robot is therefore only suitable for moving very small loads and even then, because of the clearance required between piston and cylinder and the poor radial control between these elements, the setting accuracy of the robot is extremely low. Furthermore, the robot can only turn the load a limited extent, the turning angle being limited by the setting devices coming into contact with each other.

The object of the invention is to eliminate the drawbacks of the known arrangement, thus enabling even relatively large loads to be moved with great positioning accuracy and turned at an arbitrary angle.

This is achieved in a robot of the type described in the introduction in that the frame supports a universal joint comprising a central through-hole having a cross section somewhat greater than that of the arm and wherein the arm extends through the central opening of the universal joint so that said arm can, while still maintaining radial control, be moved in axial direction and set at different angles in relation to the frame.

Figure 2:
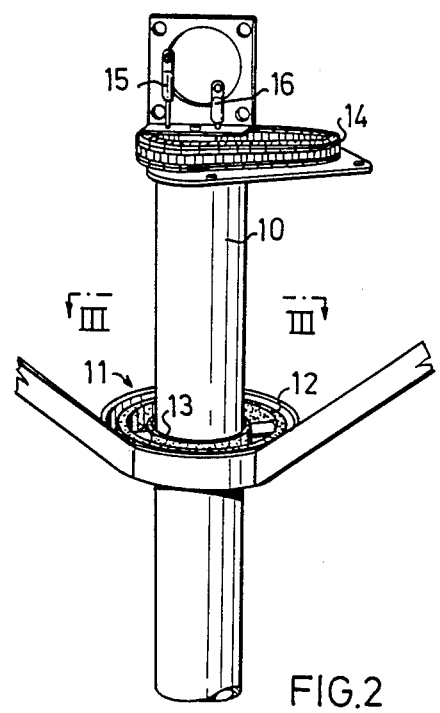
Figure 3:
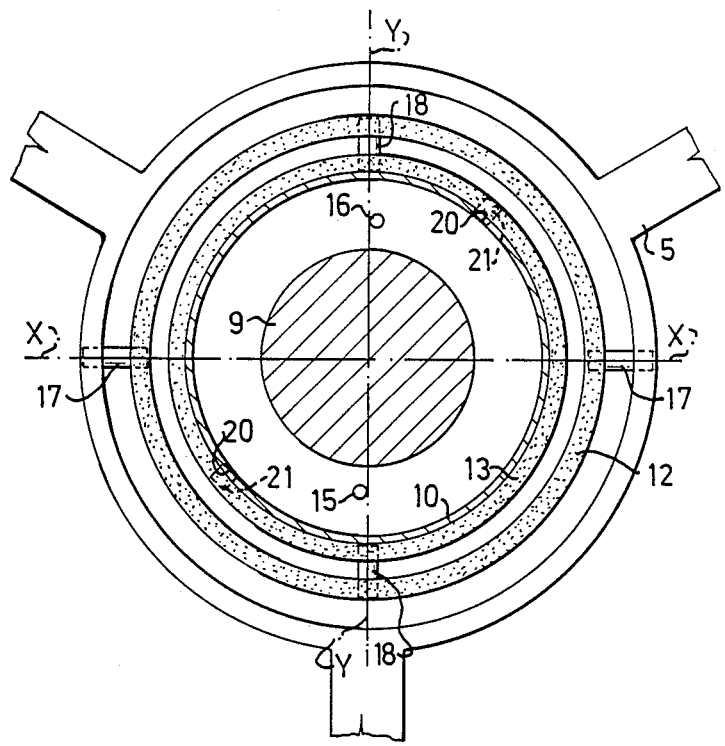
Figure 4:
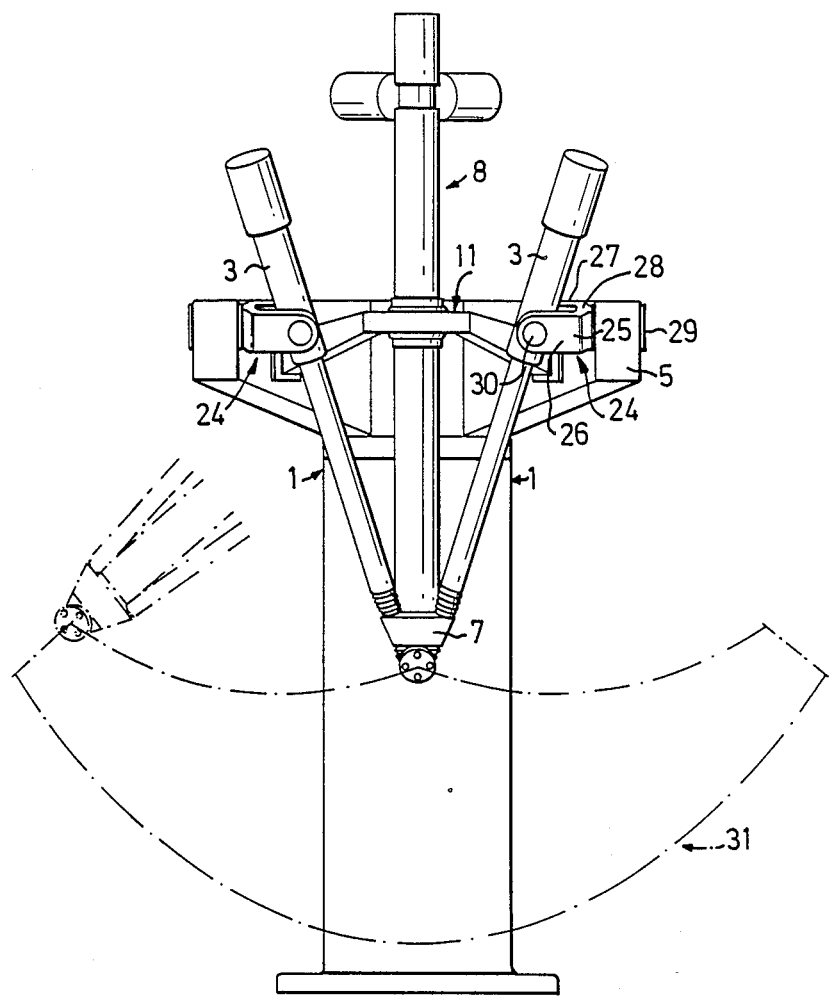

Two embodiments of the invention are described in detail in the following with reference to the accompanying drawings in which FIG. 1 shows in perspective a robot in accordance with the invention, FIG. 2 shows in perspective and on an enlarged scale a detail of the robot shown in FIG. 1, FIG. 3 shows on an enlarged scale a section along the line III—III in FIG. 2, and FIG. 4 shows in perspective and schematically a second embodiment of the invention.

The robot in the first example shown in FIGS. 1–3 comprises three setting devices 1, each being in the form of a piston 2 movable in a cylinder 3. The piston is moved in the cylinder by conventional drive means, not shown. These may be hydraulic or pneumatic means or consist of a nut and bolt mechanism or hydraulic fluid. Each cylinder end is secured via a joint 4 to a fixed frame or stand 5. The joint 4, enabling the cylinder 3 and piston 2 to pivot in all directions in relation to the frame 5, is shown here as a cardan joint but may comprise any suitable universal joint. Each piston 2 is connected via a similar joint 6 to a positioning head 7. The setting devices are arranged along the sides of an imaginary triangular pyramid and the positioning head 7 is set exactly in the desired position by moving the pistons 2 in respective cylinders 3, since the effective length of the setting devices clearly defines the location of the positioning head. The robot includes a control system, not shown, which emits signals to the setting devices causing the positioning head to move to the desired position.

An arm 8, consisting of a sleeve 10 and a shaft 9 journalled therein, extends symmetrically between the setting devices 1. The sleeve is rigidly connected to the positioning head and has two bearings at each end, the shaft 9 being pivotably journalled in these bearings. A universal joint 11 is secured to the frame 5 in an area located along the axis of symmetry of the imagined pyramid. The universal joint 11 has a central opening, with a cross section somewhat greater than the outer diameter of the sleeve 10. The sleeve extends through the central opening of the universal joint and can be displaced in axial direction in relation to the frame and the joint, while at the same time it can be set at an arbitrary angle in relation to the frame. The sleeve is thus controlled radially and is locked against turning in the joint. The sleeve 10 is sufficiently long to allow it always to be in the central opening of the universal joint 11 throughout the entire range of movement of the positioning head 7.

The universal joint 11 consists of an outer ring 12 and an inner ring 13. The outer ring 12 is attached in the frame 5 by means of two swivel pins 17 and can swing around the axis x—x formed by the pins. The inner ring is secured in the outer ring 12 by two shaft pins 18 and can swing around an axis y—y perpendicular to the axis x—x of the outer ring. The diameter of the inner diameter of the inner ring is slightly larger than the outer diameter of the sleeve. The sleeve 10 is prevented from turning in joint 11 by axial grooves 20 into which shaft pins 21 protruding radially from the inner ring 13 and secured thereto are guided. The construction of the universal joint is not decisive for the invention and it may comprise a ball-and-socket joint for instance. The sleeve 10 supports a torque motor, not shown, the turning movement being arranged by means of a suitable transmission 14, such as the chain gear shown in the drawings, to transmit a desired turning movement to the shaft 9.

The shaft end protruding through the positioning head 7 is provided with a suitable manipulating means consisting, for instance, of a motor-operated gripping device 19. The gripping movement of the device can then be controlled with the aid of operating rods 15, 16 protruding above the top end of the sleeve 10.

The embodiment of the invention shown in FIG. 4 differs primarily from the above described embodiment in the construction of the joints, which carry the setting devices 1 and in the location of those joints. Similar elements have obtained the same references in the two embodiments. Each joint 24, which in the embodiment shown in FIG. 4, pivotally connects a setting element 1 to the frame 5, consists of a fork-shaped member, comprising an U-shaped portion 25, consisting of two parallel legs 26, 27 and a connecting portion 28 joining the two legs 26, 27 to each other. A shaft pivot 29 extends from the connecting portion in the opposite direction to the legs. Said shaft pivot 29 is rotatably mounted in a hole provided in the frame 5 and axially fixed relative to the frame 5. At the free end portion of each leg 26, 27 a hole is provided for a pivot pin 30 rigidly connected to the cylinder 3. The two pivot pins 30 provided on each cylinder 3 and the two holes in each couple of legs 26, 27 form a pivot axis for the corresponding setting device 1. Said pivot axis is perpendicular to the axes of rotation of the joint 24 relative to the frame 5. Said pivot pins are distant from the end portion of the cylinder 3. As in the first embodiment the motors are arranged at the end portions of the setting devices 1. Further, range of movement 31 of the robot is shown in FIG. 4 with broken lines.

In the examples the arm 8 arranged between the setting devices 1 consists of a shaft and sleeve unit, but it could also consist of a single shaft journalled in the universal joint and in the positioning head 7. Furthermore, there may be more than the three setting devices shown in the drawings. Neither need they be arranged symmetrically around the arm 8. The locking means preventing turning between the sleeve 10 and the inner ring 13 may also be designed in several different ways. There might, for instance, be a number of guides in the form of ball guides. Furthermore, the axial grooves might be provided in the universal joint 11 instead of in the sleeve 10, in which case the sleeve would be provided with radially protruding guide means. The shaft 9 may also be displaceable in the sleeve 10.

I claim:

1. A robot comprising at least three telescopic setting devices each of which can be lengthened and shortened in its longitudinal direction, each setting device of said three setting devices being secured via a first joint to a fixed frame enabling each said setting device to pivot freely in relation to said frame and one end of each said setting device being attached via a second joint to a movable positioning head, and an intermediate arm extending from said positioning head and located between said setting devices (1), wherein said frame supports a universal joint comprising a central through-hole having a cross section somewhat greater than that of said intermediate arm and wherein said intermediate arm extends slidingly through said central through hole of said universal joint so that said arm can be moved with radial control in axial direction and set at different angles to said frame.

2. A robot according to claim 1, wherein said three setting devices are arranged along the sides of an imaginary triangular pyramid.

3. A robot according to claim 2, wherein said arm is located symmetrically between said three setting devices.

4. A robot according to one of claims 1, 2 or 3, wherein said arm is secured against turning in said universal joint.

5. A robot according to claim 4, wherein said arm is provided with axial grooves for engagement with control members protruding from said universal joint.

6. A robot according to one of claims 1, 2 or 3, wherein said arm extends through said positioning head, the end protruding from said positioning head supporting manipulating means.

7. A robot according to claim 6, wherein said universal joint for control of said arm consists of a cardan joint comprising an outer ring and an inner ring, said outer ring being pivotable about a first axis connected to said frame and said inner ring being pivotable about a second axis perpendicular to said first axis and connected to said outer ring.

8. A robot according to claim 7, wherein said arm consists of a tubular sleeve connected to said positioning head and a shaft rotatable relatively to said tubular sleeve, said tubular sleeve extending through said central opening of said universal joint.

9. A robot according to claim 8, wherein said sleeve supports a torque motor and a coupling member is arranged to transmit the turning movement of said torque motor to said shaft inside said tubular sleeve.

* * * * *